(12) United States Patent
Benoist

(10) Patent No.: US 7,668,546 B2
(45) Date of Patent: Feb. 23, 2010

(54) APPARATUS, METHOD AND COMPUTER PROGRAM PRODUCT TO MAINTAIN USER EQUIPMENT SERVING GRANT AT CELL CHANGE

(75) Inventor: Sébire Benoist, Beijing (CN)

(73) Assignee: Nokia Corporation, Espoo (FI)

( * ) Notice: Subject to any disclaimer, the term of this patent is extended or adjusted under 35 U.S.C. 154(b) by 422 days.

(21) Appl. No.: 11/320,988

(22) Filed: Dec. 28, 2005

(65) Prior Publication Data

US 2007/0036108 A1 Feb. 15, 2007

Related U.S. Application Data

(60) Provisional application No. 60/708,721, filed on Aug. 15, 2005.

(51) Int. Cl.
*H04Q 7/20* (2006.01)
(52) U.S. Cl. .................. 455/436; 455/433; 370/310
(58) Field of Classification Search .............. 455/432.1, 455/433, 574, 509, 435.1, 436; 370/310
See application file for complete search history.

(56) References Cited

U.S. PATENT DOCUMENTS

| 7,280,828 | B1 * | 10/2007 | Shah ........................... 455/434 |
| 7,418,266 | B2 * | 8/2008 | Liu ............................. 455/450 |
| 2004/0157600 | A1 * | 8/2004 | Stumpert et al. .......... 455/432.1 |
| 2004/0162083 | A1 | 8/2004 | Chen et al. ................. 455/454 |
| 2004/0219919 | A1 * | 11/2004 | Whinnett et al. ........... 455/442 |
| 2005/0043050 | A1 * | 2/2005 | Lee et al. ................... 455/515 |
| 2005/0088988 | A1 * | 4/2005 | Kwon et al. ................ 370/328 |
| 2006/0018277 | A1 * | 1/2006 | Petrovic et al. ............. 370/329 |
| 2006/0172739 | A1 * | 8/2006 | Wigard et al. .............. 455/442 |
| 2007/0010281 | A1 * | 1/2007 | Sebire ........................ 455/525 |
| 2007/0025300 | A1 * | 2/2007 | Terry et al. ................. 370/335 |
| 2007/0115871 | A1 * | 5/2007 | Zhang et al. ................ 370/318 |
| 2008/0076432 | A1 * | 3/2008 | Senarath et al. ............ 455/442 |
| 2008/0273483 | A1 * | 11/2008 | Zhang et al. ................ 370/318 |

FOREIGN PATENT DOCUMENTS

| EP | 1 708 523 A1 | 10/2006 |
| WO | WO-2006/081874 A1 | 8/2006 |
| WO | WO-2006/103099 A1 | 10/2006 |

OTHER PUBLICATIONS

3GPP TS 25.309 V6.3.0 (Jun. 2005), 3rd Generation Partnership Project; Technical Specification Group Radio Access Network; FDD Enhanced Uplink; Overall description; Stage 2 (Release 6), pp. 1-33.

* cited by examiner

*Primary Examiner*—Charles N Appiah
*Assistant Examiner*—Joy K Contee
(74) *Attorney, Agent, or Firm*—Harrington & Smith

(57) ABSTRACT

A method includes storing a first Serving Grant (SG) value for use in a first serving cell, entering a second serving cell, receiving an information element from a higher layer, maintaining the first SG value if the information element does not include a second SG value, and changing the first SG value to the second SG value if the information element includes a second SG value.

16 Claims, 4 Drawing Sheets

| INFORMATION ELEMENT/ GROUP NAME | NEED | MULTI | TYPE AND REFERENCE | SOMANTICS DESCRIPTION | VERSION |
|---|---|---|---|---|---|
| E-TFCI TABLE INDEX | MP | | INTEGER (0...1) | INDICATES WHICH STANDARDISED E-TFCI TB SIZE TABLE SHALL BE USED | REL-6 |
| E-DCH MINIMUM SET E-TFCI | MD | | INTEGER (0...127) | SEE [15]; ABSENCE MEANS NO E-DCH MINIMUM SET | |
| REFERENCE E-TFCIs | MP | 1 TO [8] | | SEE [29] | REL-6 |
| >REFERENCE E-TFCI | MP | | INTEGER (0...127) | | REL-6 |
| >REFERENCE E-TFCI PO | MP | | FFS | | REL-6 |
| MAXIMUM CHANNELISATION CODES | MP | | ENUMERATED ( sf64, sf32, sf16, sf8, sf4, 2sf4, 2sf2, 2sf2 AND 2sf4) | | REL-6 |
| PL$_{non-max}$ | MP | | REAL (0.44...1.0 BY STEP OF 0.04) | AS DEFINED IN [27] | REL-6 |
| SCHEDULING INFORMATION CONFIGURATION | MP | | | | REL-6 |
| >PERIODICITY FOR SCHEDULING INFO - NO GRANT | MD | | ENUMERATED (everyMACe PDU, 4, 10, 20, 50, 100, 200, 500, 1000) | VALUES IN ms DEFAULT VALUE IS "NO REPORT" | REL-6 |

FIG.2A

| FIG.2A |
|---|
| FIG.2B |

FIG.2

| | | | |
|---|---|---|---|
| >PERIODICITY FOR SCHEDULING INFO - GRANT | MD | ENUMERATED (everyMACe PDU, 4, 10, 20, 50, 100, 200, 500, 1000) | VALUES IN ms DEFAULT VALUE IS "NO REPORT" | REL-6 |
| >POWER OFFSET FOR SCHEDULING INFO | MP | INTEGER (0...6) | ONLY USED WHEN NO MACd PDU's ARE INCLUDED IN THE SAME MACe PDU. UNIT IS IN dB | REL-6 |
| SCHEDULED TRANSMISSION CONFIGURATION | MP | | | REL-6 |
| >2ms SCHEDULED TRANSMISSION GRANT HARQ PROCESS ALLOCATION | MD | BITSTRING (8) | MAC-d PDU's BELONGING TO MAC-d FLOWS NOT CONFIGURED WITH A "MAX MAC-e PDU CONTENTS SIZE" ARE ONLY ALLOWED TO BE TRANSMITTED IN THOSE PROCESSES FOR WHICH THE BIT IS SET TO "1" BIT 0 CORRESPONDS TO HARQ PROCESSES 0, BIT 1 CORRESPONDS TO HARQ PROCESS 1... | REL-6 |
| | | | DEFAULT VALUE IS: TRANSMISSION IN ALL HARQ PROCESSES IS ALLOWED | |
| >SERVING GRANT | OP | INTEGER (0...31) | | REL-6 |
| >PRIMARY/SECONDARY GRANT SELECTOR | OP | ENUMERATED ("PRIMARY", "SECONDARY") | INDICATES WHETHER THE SERVING GRANT IS RECEIVED WITH A PRIMARY E-RNTI OR SECONDARY E-RNTI | REL-6 |

FIG.2B

APPARATUS, METHOD AND COMPUTER PROGRAM PRODUCT TO MAINTAIN USER EQUIPMENT SERVING GRANT AT CELL CHANGE

CROSS REFERENCE TO RELATED APPLICATION

This application claims the benefit of U.S. Provisional Application No. 60/708,721 filed Aug. 15, 2005.

TECHNICAL FIELD

The exemplary and non-limiting embodiments of this invention relate generally to wireless communication systems, apparatus and methods and, more specifically, relate to cellular wireless communication system techniques for enabling user equipment to change from one serving cell to another serving cell.

BACKGROUND

The following abbreviations are defined as follows:
DCH Dedicated Channel
DPDCH Dedicated Physical Data Channel
DPCCH Dedicated Physical Control Channel
EDCH Enhanced Uplink DCH
E-DPDCH Enhanced DPDCH
E-RNTI EDCH RNTI
HARQ Hybrid Automatic Repeat Request
HSUPA High Speed Uplink Packet Access
IE Information Element
MAC-e Enhanced Media Access Control
Node B Network Node, eg., a Base station
RNC Radio Network Controller
RNTI Radio Network Temporary Identifier
RRC Radio Resource Control
SG Serving Grant
UE User Equipment, eg., a mobile terminal of interest herein is the uplink DCH (EDCH) for packet data traffic in, for example, Release 6 of 3GPP TS 25.309, 3$^{rd}$ Generation Partnership Project; Technical Specification Group Radio Access Network; FDD Enhanced Uplink; Overall Description; Stage 2 (Release 6).

In HSUPA, attempts at enhancements are currently approached by distributing some of the packet scheduler functionality to the Node Bs to provide faster scheduling of bursty, non-real-time traffic than can be provided by the Layer 3 (L3, Network Layer) of the RNC. The principle animating this approach is that, with faster link adaptation, it is possible to more efficiently share the uplink power resource between packet data users. For example, when packets have been transmitted from one user the scheduled resource can be made available immediately to another user. This technique attempts to avoid the peaked variability of noise rise, such as when high data rates are being allocated to users that are running bursty high data-rate applications.

In the current architecture the packet scheduler is located in the RNC. As a result, the packet scheduler is limited in its ability to adapt to the instantaneous traffic due at least in part to bandwidth constraints on the RRC signaling interface between the RNC and the UE. Hence, to accommodate the variability, the packet scheduler must be conservative in allocating uplink power to take into account the influence from inactive users in the following scheduling period. However, this solution has been found to be spectrally inefficient for high allocated data-rates and long release timer values.

With EDCH, much of the packet scheduler functionality is transferred to the Node B, i.e., there is a Node B scheduler that takes care of allocating uplink resources, including controlling the SG of the UE.

Each time the UE enters a new cell, it receives the SG either from the RNC through RRC signaling, or from the serving Node B via Layer 2 (L2, data link layer) signaling (absolute grant channel).

However, when the UE moves from one cell to another there is no simple means for the SG to be maintained. This makes service continuity difficult and limits the HSUPA in its ability to efficiently support services with guaranteed bit rates.

Further, from the received data the RNC can assess the value of the scheduled grant and, when the cell is changed, it can include that value in the RRC signaling. However, since the SG is given in terms of maximum E-DPDCH to DPCCH power ratio that the UE is allowed to use for scheduled data, such an assessment is not straightforward for the RNC and may be subject to large error. In other words, it is difficult for the RNC to assess the value of the SG being used by the serving cell and, consequently, it is also difficult for RNC to maintain the correct value of the SG during a cell change.

SUMMARY OF THE INVENTION

In accordance with an exemplary embodiment of the invention, a method includes storing a first Serving Grant (SG) value for use in a first serving cell, entering a second serving cell, receiving an information element from a higher layer, maintaining the first SG value if the information element does not include a second SG value, and changing the first SG value to the second SG value if the information element includes a second SG value.

In accordance with another exemplary embodiment of the invention, a mobile terminal includes a memory for storing a first Serving Grant (SG) value when the mobile terminal is within a first serving cell, a means for receiving an information element from a higher layer upon entering a second serving cell, a means for determining if the information element includes a second SG value, a means for maintaining the first SG value if the information element does not include a second SG value, and a means for changing the first SG value to the second SG value if the information element comprises a second SG value.

In accordance with another exemplary embodiment of the invention, a program of machine-readable instructions, tangibly embodied on an information bearing medium and executable by a digital data processor, performs actions directed toward establishing a Serving Grant (SG), wherein the actions include storing a first Serving Grant (SG) value for use in a first serving cell, receiving an information element from a higher layer upon entering a second serving cell, determining if the information element includes a second SG value, maintaining the first SG value if the information element does not comprise a second SG value, and changing the first SG value to the second SG value if the information element includes a second SG value.

BRIEF DESCRIPTION OF THE DRAWINGS

In the attached Drawing Figures:

FIGS. 2A-2B, collectively referred to herein as FIG. 2, illustrate an exemplary embodiment of the E-DPDCH of the invention.

DETAILED DESCRIPTION

The exemplary embodiments of this invention relate at least in part to providing an enhancement of the uplink DCH (EDCH) for packet data traffic in, for example, Release 6 of 3GPP TS 25.309, $3^{rd}$ Generation Partnership Project; Technical Specification Group Radio Access Network; FDD Enhanced Uplink; Overall Description; Stage 2 (Release 6).

Figure 1:
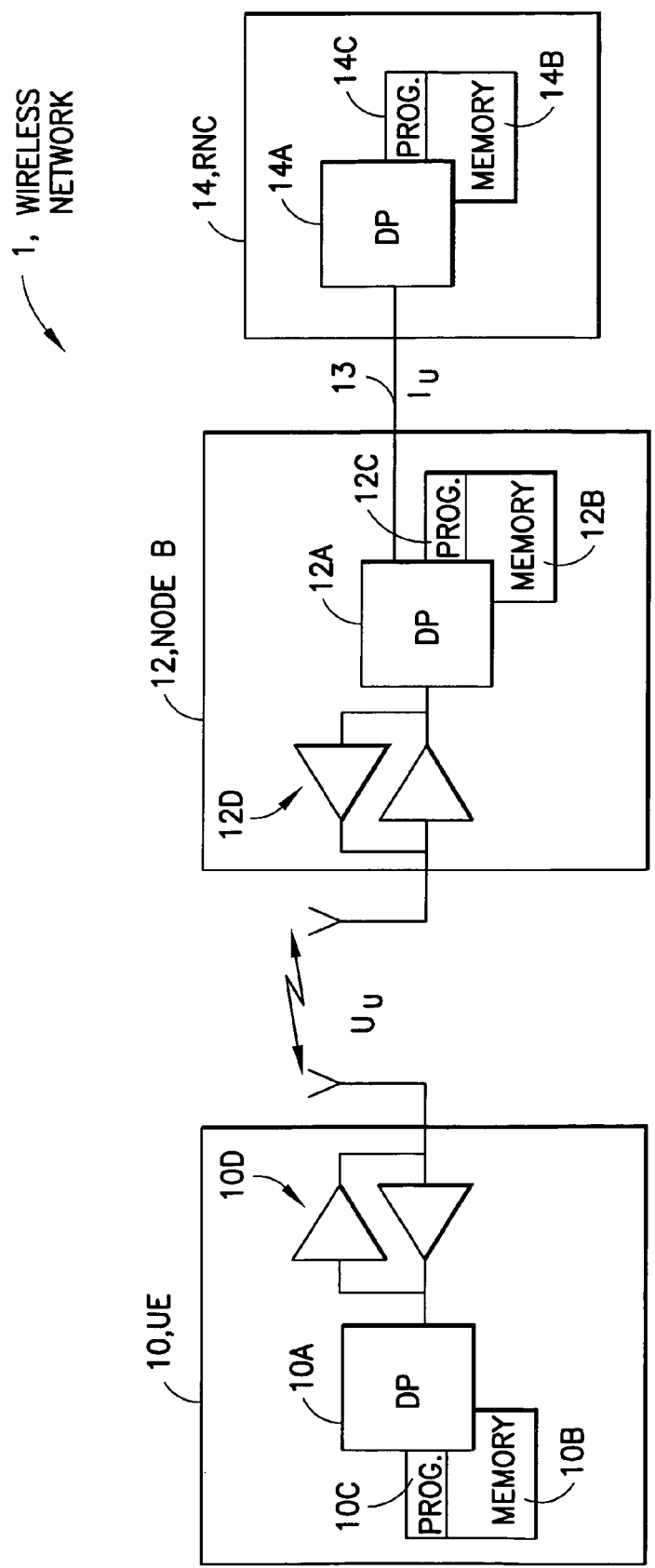
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 includes a UE 10, a Node B (base station) 12 and a RNC 14. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the RNC 14 that also includes a DP 14A and a MEM 14B storing an associated PROG 14C. The PROGs 10C, 12C and 14C are assumed to include program instructions that, when executed by the associated DP, enable the electronic device to operate in accordance with the exemplary embodiments of this invention, as will be discussed below in greater detail. As shown in FIG. 1, the Uu interface is the interface between the UTRAN and the UE, while the Iu is the interconnection point between the RNC or a BSC (Base Station Controller) and 3G (Third Generation) core network (CN).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 10A of the UE 10 and the other DPs, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

There is now described in further detail exemplary embodiments of this invention whereby the SG value of a UE is determined when the UE experiences a cell change. In one such embodiment, when engaging in RRC signaling, the Serving Grant information element (IE) is made optional in the E-DPDCH information element and when the SG IE is not present, the UE 10 maintains the same SG that it was using before the cell change. In an alternative embodiment, the SG is also made optional when scheduling E-DCH Cell Information.

FIG. 2 illustrates an exemplary embodiment of the E-DPDCH Info and the Serving Grant information element (IE) of most interest to this invention is found in FIG. 2B. It is this IE that is made optional in accordance with the exemplary embodiments of this invention and is designated as such by a "Need" attribute of OP (for "Optional"). When a UE 10 experiences a EDCH serving cell change, the higher layer in communication with the UE 10 configures a MAC-e with the SG value to use in the new cell and indicates if the UE 10 should monitor Absolute Grant Messages with its secondary E-RNTI More specifically, the higher layer indicates which E-RNTI the UE should monitor when entering the new cell, the primary or secondary E-RNTI. As used herein, "higher layer" refers to an entity in communication with the UE including, but not limited to, a Node B and a RNC.

Figure 3:
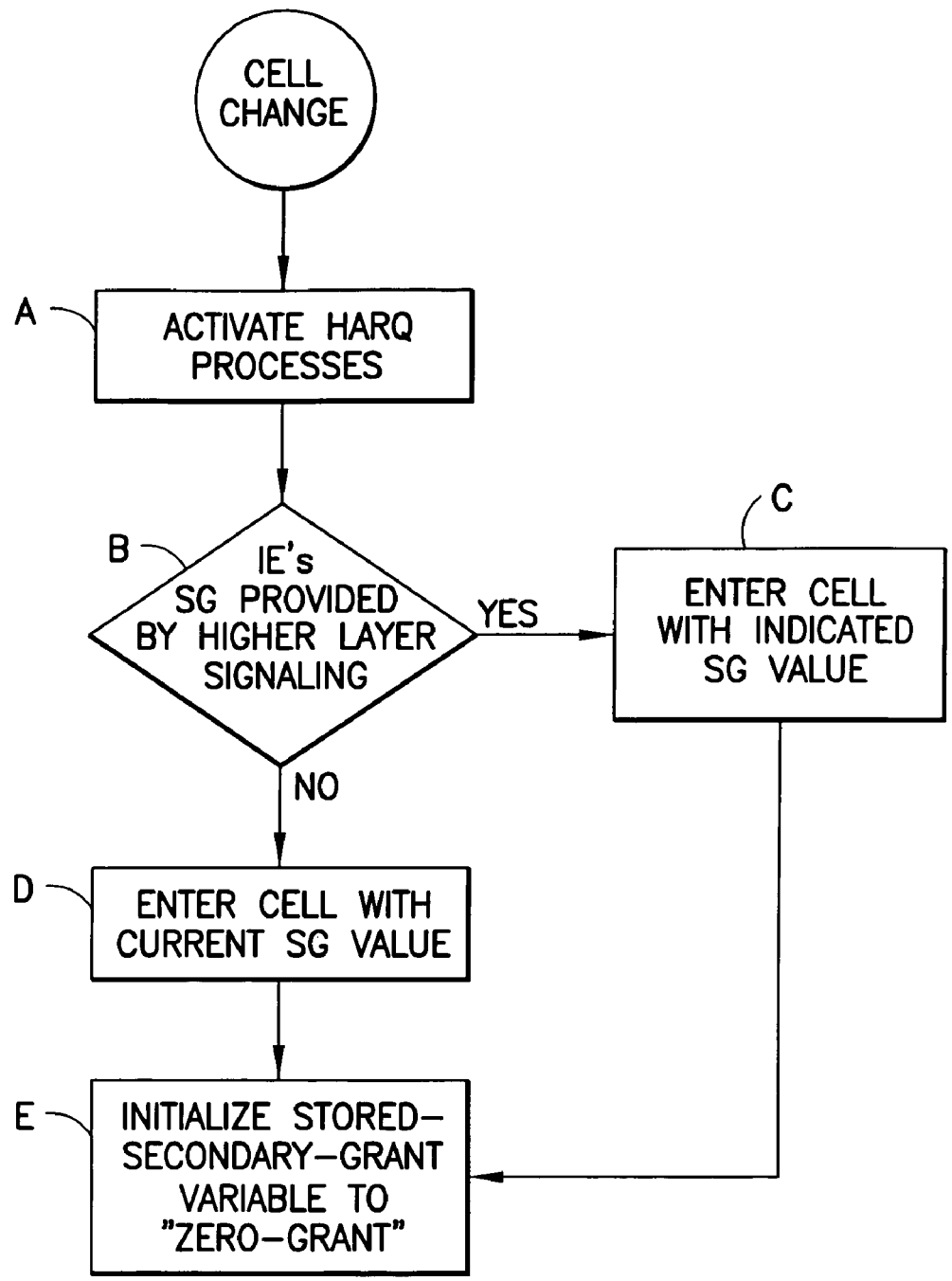
FIG. 3 is a logic flow diagram that illustrates UE operation at cell change in accordance with exemplary embodiments of this invention.

With reference to FIG. 3, there is illustrated a flow chart of an exemplary embodiment of a method of the invention. In the event of a cell change, the UE 10 activates all required HARQ processes (Step A). UE 10 proceeds to make a determination if the IE Serving Grant is included in the received higher layer signaling (Step B). Forms of such higher layer signaling include, but are not limited to, RRC signaling and signaling performed via a L2 data link layer. If an IE Serving Grant is included in the higher level signaling, the UE 10 accepts the value indicated and enters the new cell with the indicated SG value (Step C). Specifically, the UE's 10 Serving_Grant and Primary_Grant_Available state variables are set to the values provided by the higher layers.

However, if the IE Serving Grant is not included in the higher layer signaling, the current SG is not changed and the UE enters the new cell with the same SG it was using in the old cell (Step D). Specifically, the UE 10 continues to operate using the values previously stored in the Serving_Grant and Primary_Grant_Available state variables.

In either case (Step C or Step D), the UE 10 proceeds to initialize the state variable Stored_Secondary_Grant to "Zero_Grant".

At initial access, if the Serving Grant IE is not present a default value may be used for the SG, such as Minimum_Grant or Zero_Grant. Alternatively, and since the RRC controls the initial access, it may always include a value for the Serving Grant IE, such as one equal to Minimum_Grant or Zero_Grant.

In an exemplary embodiment of the invention, it is noted that a UE 10 can change cells within the same Node B. In such an instance, both the old and new serving cell are capable of sharing data internally. In such an instance, the two serving cells are able to exchange relevant SG information concerning a UE 10 switching from one cell to another without the need to engage in a change of the UE's 10 present SG value.

Based on the foregoing it should be apparent that the exemplary embodiments of this invention provide a method, apparatus and computer program product(s) to determine at a cell change if a Serving Grant is specified for the UE, and if it is to use the specified SG value, and if it is not to use a current value of the SG when entering the new cell.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    storing in a memory a first serving grant value associated with a first serving cell;
    receiving at a receiver an information element during transition to a second serving cell;
    maintaining said first serving grant value in the memory for use in the second serving cell if said information element does not comprise any serving grant value; and
    if said information element includes any serving grant value then replacing said first serving grant value in the memory with the included serving grant value for use in the second serving cell;
    wherein the first serving grant value indicates a maximum power ratio of a data channel to a control channel.

2. The method of claim 1 wherein said receiving comprises receiving said information element from a Radio Network Controller.

3. The method of claim 2 wherein said information element is received via Radio Resource Control signaling.

4. The method of claim 1 wherein said receiving comprises receiving said information element from a Node B.

5. The method of claim 4 comprising receiving said information element via Radio Resource Control signaling.

6. An information bearing medium tangibly embodying a program of machine-readable instructions that, when executed by a digital data processor, cause the processor to perform at least the following:
    storing a first serving grant value associated with a first serving cell;
    receiving an information element during transition from the first serving cell to a second serving cell;
    determining whether said information element includes any serving grant value; and
    if the information element includes any serving grant value then using the included serving grant value in the second serving cell and, if the information element does not include any serving grant value then continuing to use the stored first serving grant value in the second serving cell;
    wherein the first serving grant value indicates a maximum power ratio of a data channel to a control channel.

7. The information bearing medium of claim 6 wherein said receiving comprises receiving said information element from a Radio Network Controller.

8. The information bearing medium of claim 7 wherein said information element is received via Radio Resource Control signaling.

9. The information bearing medium of claim 6 wherein said receiving comprises receiving said information element from a Node B.

10. An apparatus, comprising:
    a radio frequency receiver;
    a memory storing a first serving grant value associated with a first serving cell; and
    a controller configured with said radio frequency receiver and with said memory, said controller configured to determine if a serving grant information element is received during transition from said first serving cell to a second serving cell, and in response to determining that said serving grant information element is not received, to continue use of the first serving grant value stored in said memory in said second serving cell, said controller being further configured in response to determining that said serving grant information element is received during transition from said first serving cell to said second serving cell, then to use a value of the received serving grant information element in the second serving cell and to replace the first serving grant value in said memory with the value of the received serving grant information element; wherein the first serving grant value indicates a maximum power ratio of a data channel to a control channel.

11. The apparatus of claim 10, embodied in a user equipment.

12. The apparatus of claim 11, said user equipment operable with a high speed uplink packet access wireless communication system.

13. The apparatus of claim 10, where said serving grant information element is received from a Node B.

14. The apparatus of claim 10, where at least said controller is embodied in an integrated circuit.

15. The method of claim 1, wherein the first serving grant value indicates which absolute grant messages should be monitored.

16. The apparatus of claim 10, wherein the first serving grant value indicates which absolute grant messages should be monitored.

* * * * *